July 20, 1943.   L. FINE ET AL   2,324,919
APPARATUS FOR USE IN FABRICATING TUNNEL LINING SEGMENTS
Filed July 31, 1940   11 Sheets-Sheet 1

Inventors
Lewis Fine and
Harley B. Kelchner
By P. S. A. Dougherty
Attorney

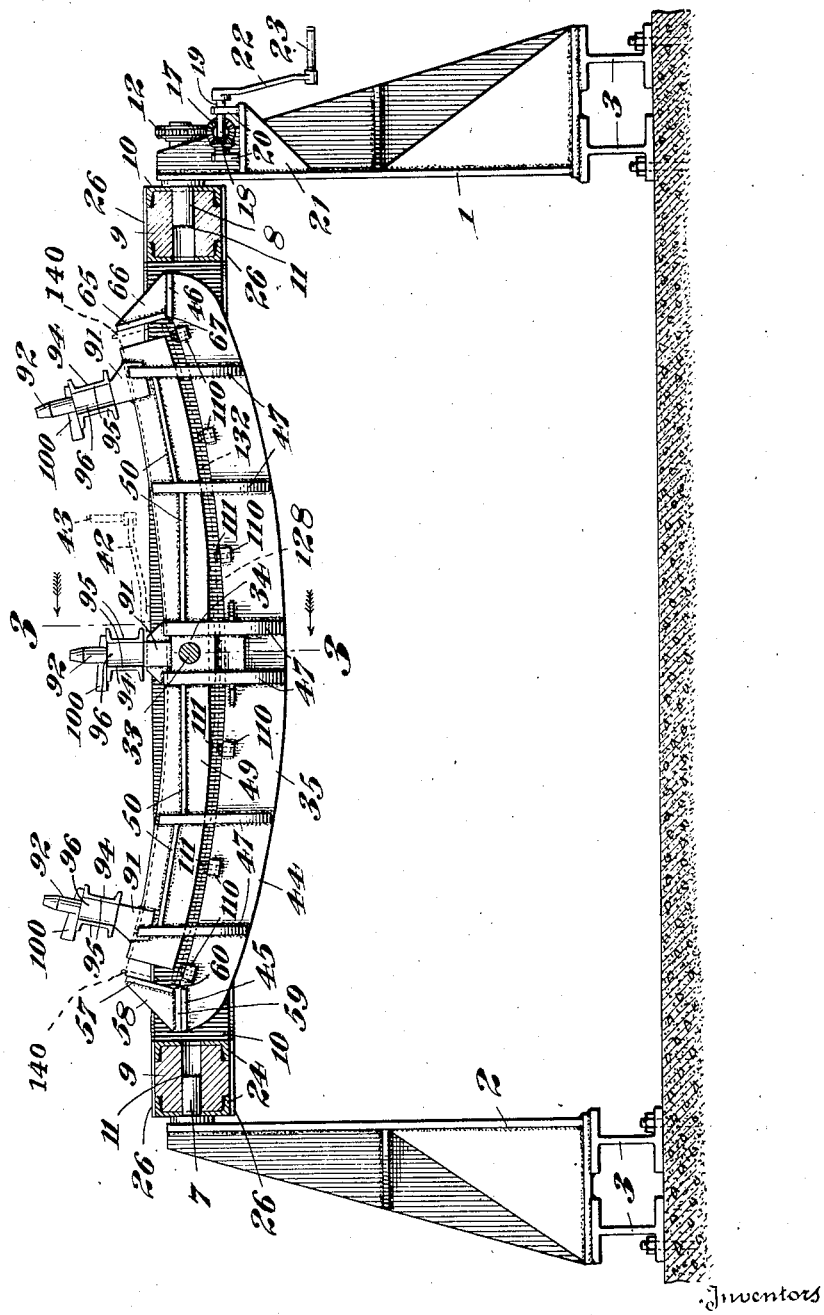

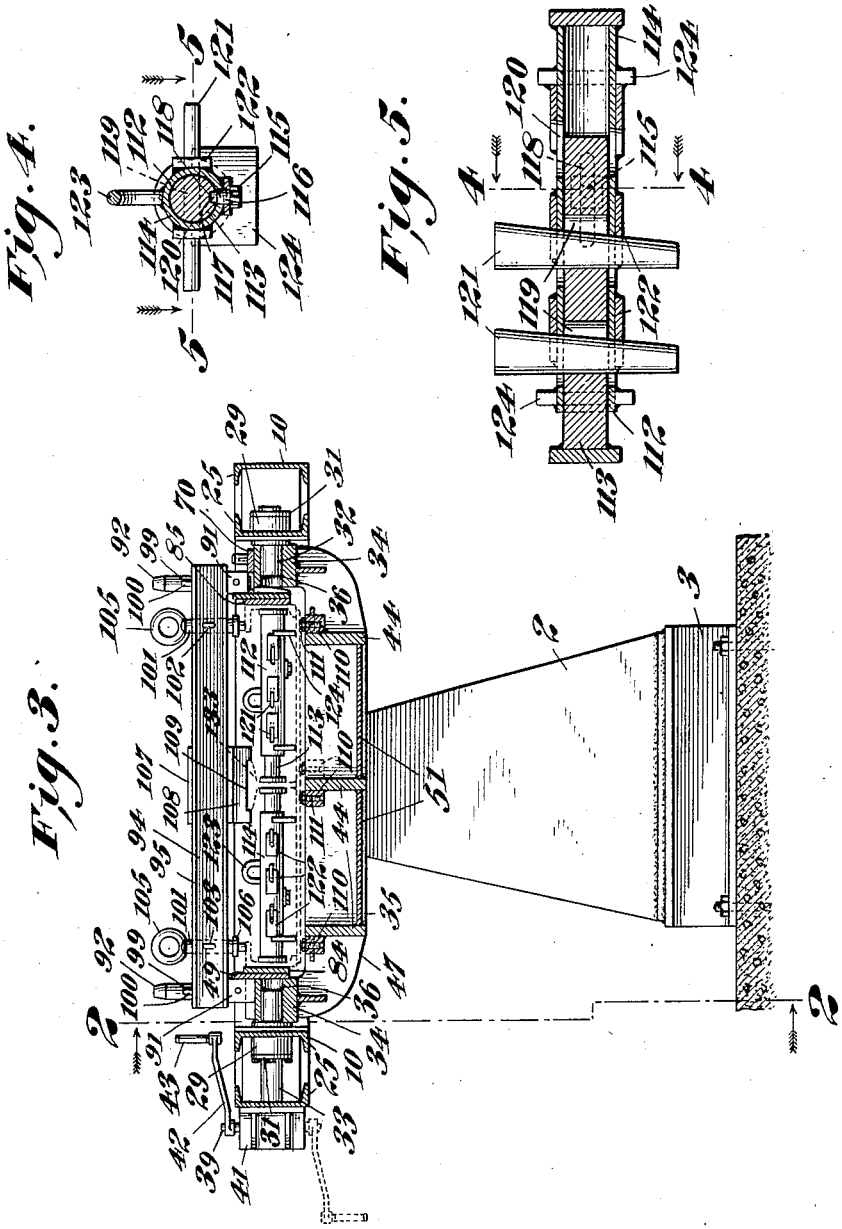

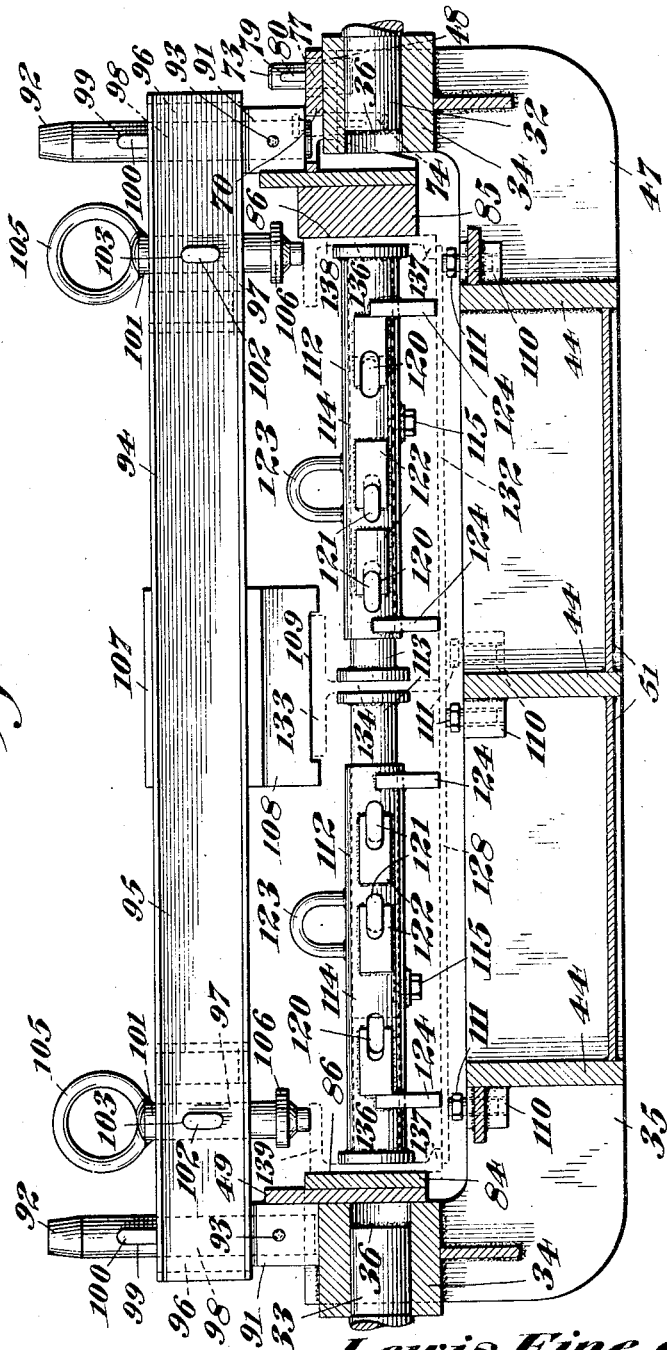

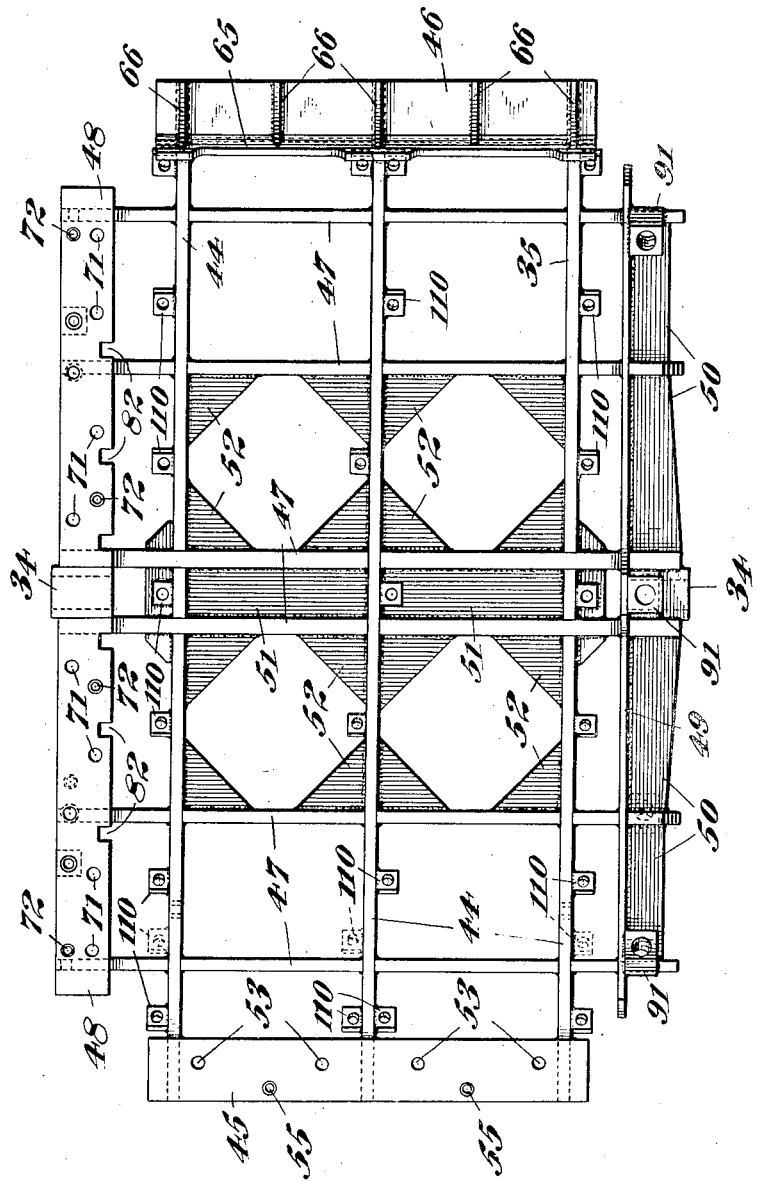

July 20, 1943.    L. FINE ET AL    2,324,919
APPARATUS FOR USE IN FABRICATING TUNNEL LINING SEGMENTS
Filed July 31, 1940    11 Sheets-Sheet 6
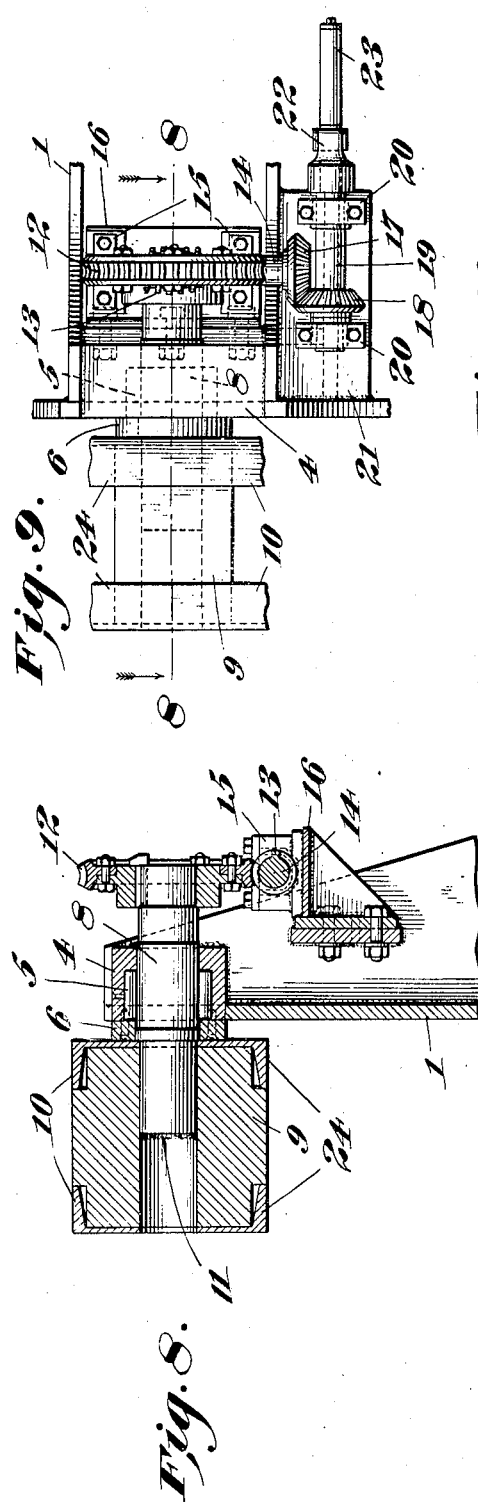
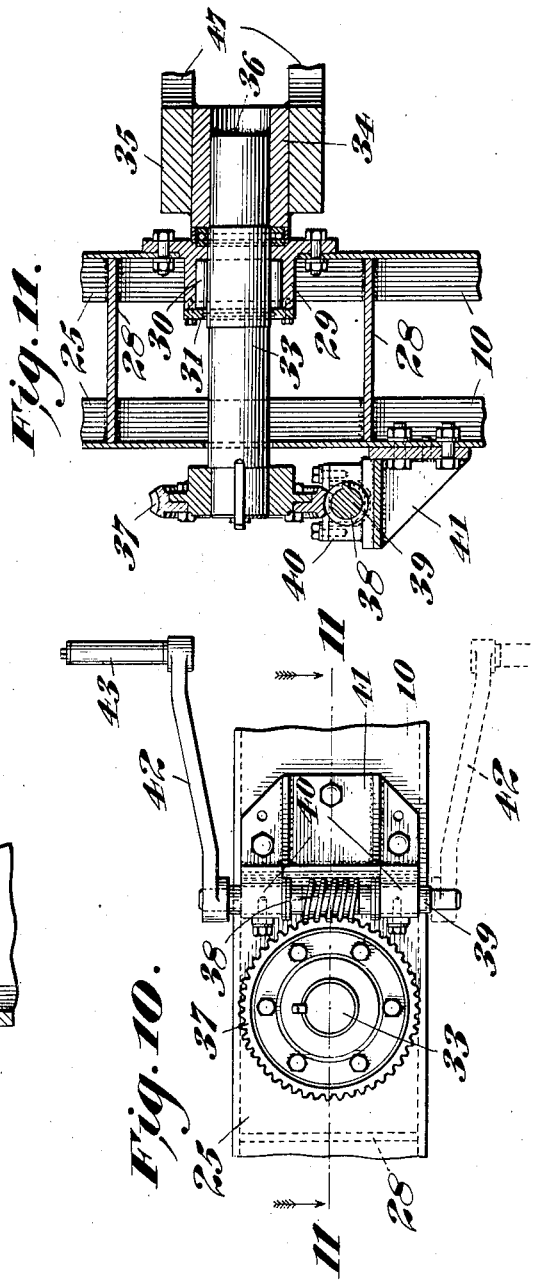
Inventors
Lewis Fine and
Harley B. Kelchner
By
Attorney

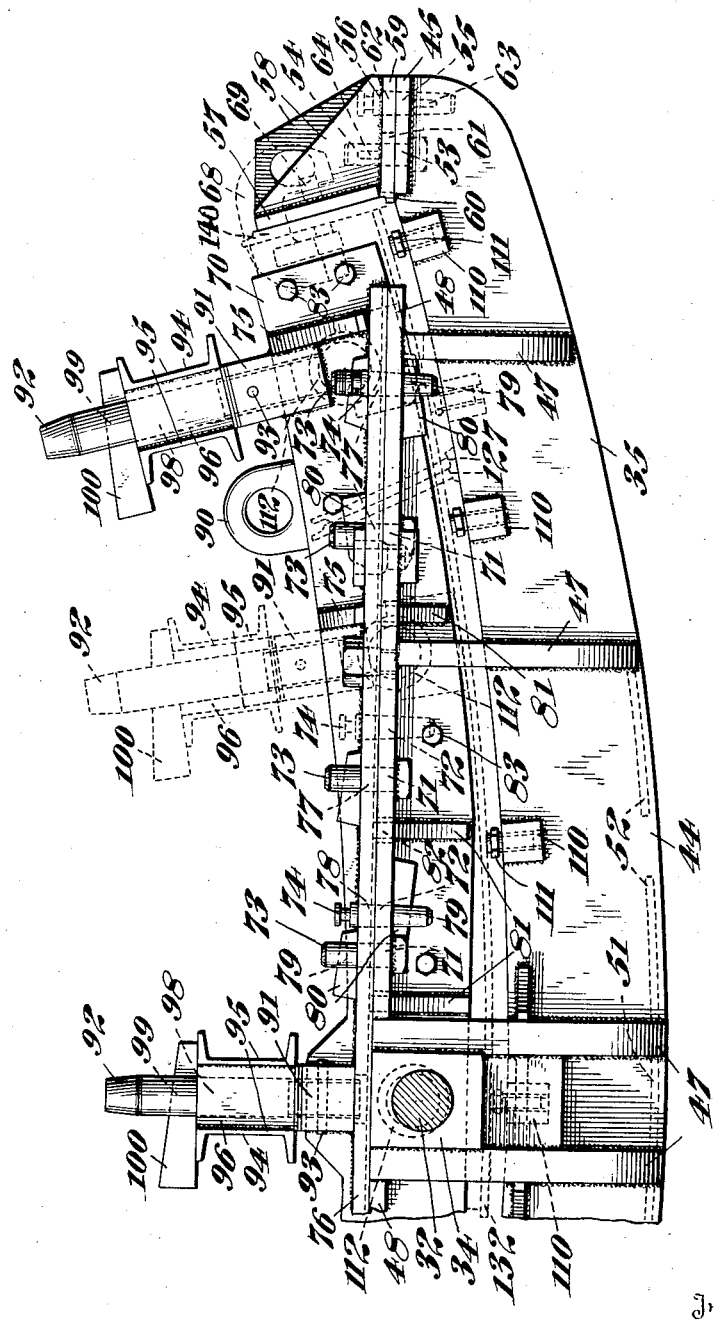

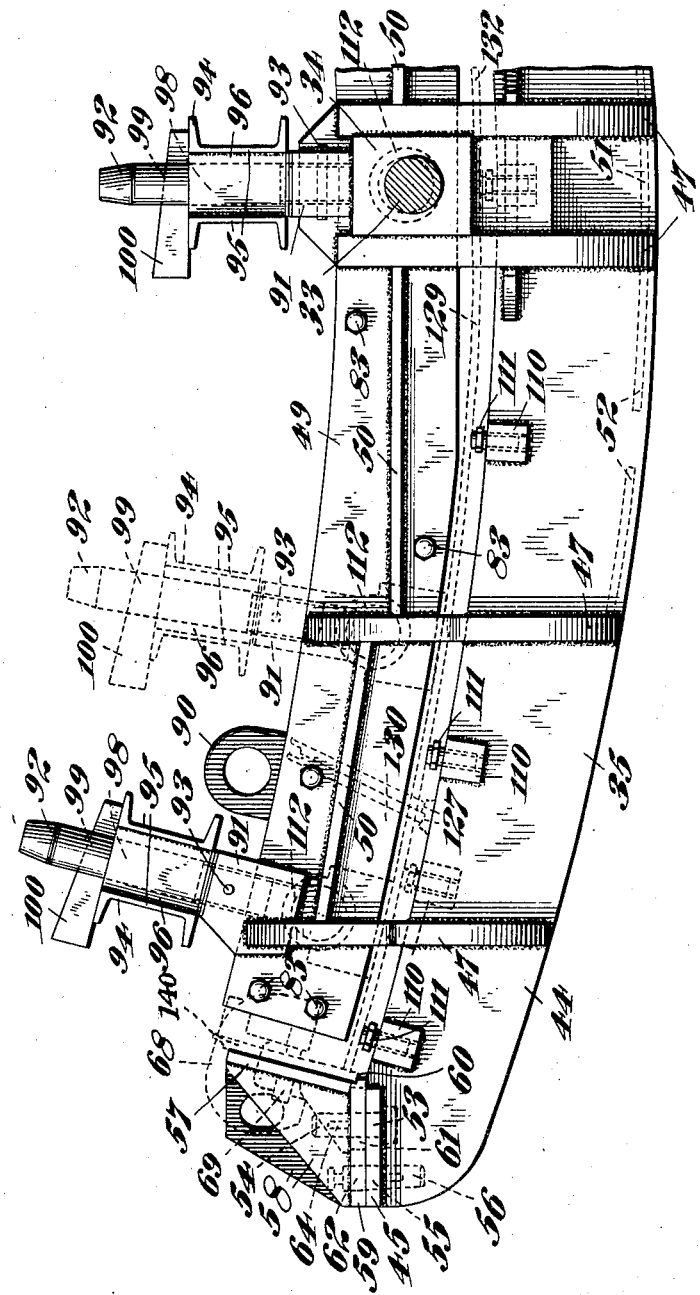

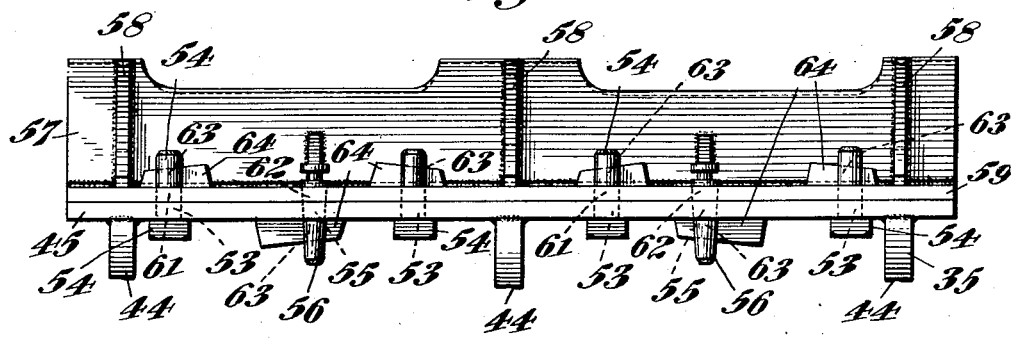
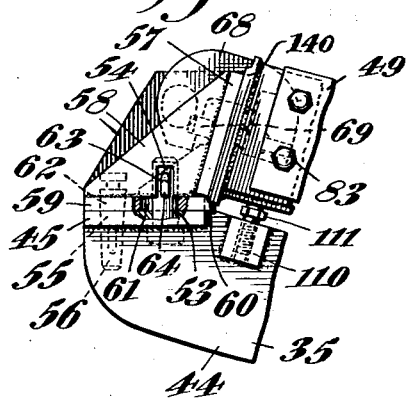
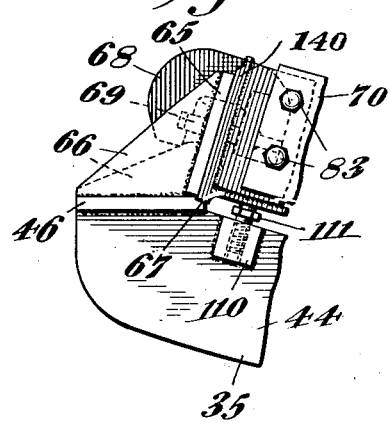
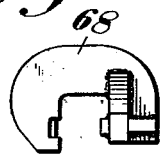
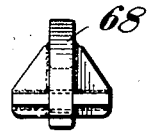

July 20, 1943.　　　L. FINE ET AL　　　2,324,919
APPARATUS FOR USE IN FABRICATING TUNNEL LINING SEGMENTS
Filed July 31, 1940　　　11 Sheets-Sheet 10
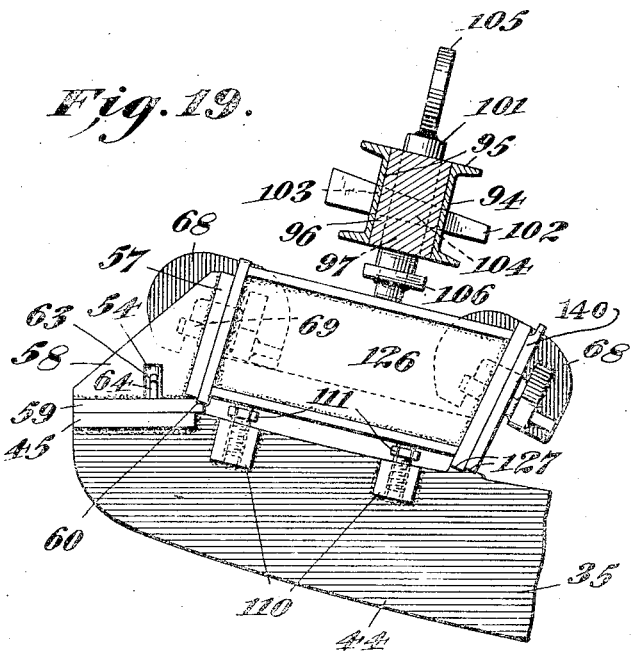
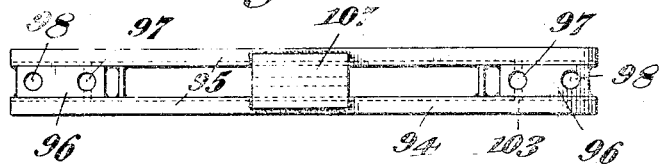
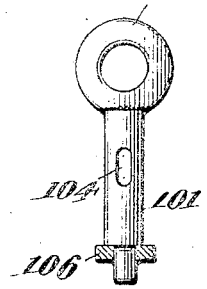
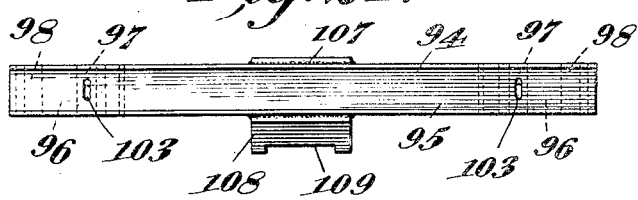
Inventors
Lewis Fine and
Harley B. Kelchner
By R. S. A. Dougherty
Attorney

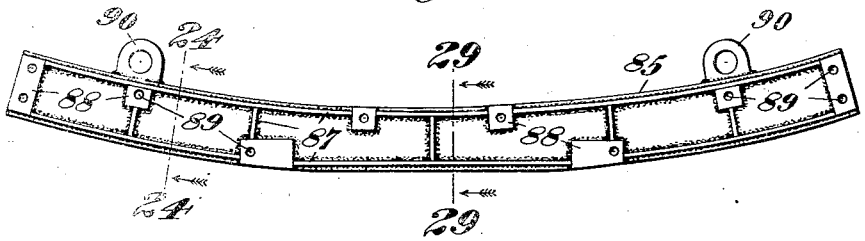
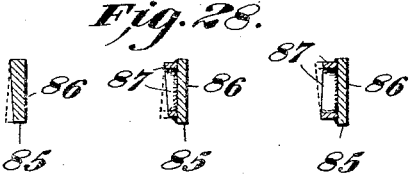
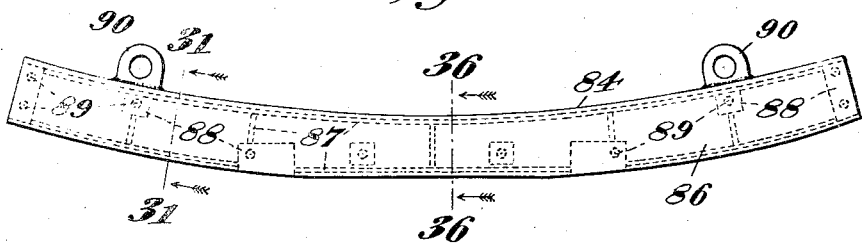
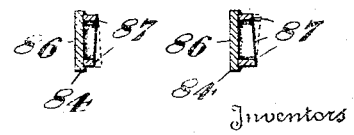

Patented July 20, 1943

2,324,919

UNITED STATES PATENT OFFICE 2,324,919

APPARATUS FOR USE IN FABRICATING TUNNEL LINING SEGMENTS

Lewis Fine, Bethlehem, and Harley B. Kelchner, Lower Saucon Township, Northampton County, Pa., assignors to Bethlehem Steel Company, a corporation of Pennsylvania Application July 31, 1940, Serial No. 348,610

27 Claims. (Cl. 113—99)

This invention relates to apparatus for manufacturing tunnel lining segments of structural steel and is more particularly adapted to the manner of assembling and holding the parts of which the tunnel segments are formed to facilitate welding of the same together to produce a single unit such as disclosed in our co-pending application Serial No. 404,010 filed July 25, 1941.

Our invention is especially adapted for use in making tapered tunnel lining segments of structural steel shapes having side and end edge flanges which will have true contact engaging surfaces when the segments and tunnel lining rings are secured together, but it is also adapted for making tunnel segments having parallel side flanges equally as well.

At the present time the usual practice in producing cast tapered segments for constructing curves in tunnels, which is the kind most commonly used heretofore, is to have the segments assembled in a ring on a tapered base ring and horizontally machined on the side flanges of the ring by circular planing or milling. The general practice is to provide the taper on one face only. If it is essential that both faces be tapered, or one half of the taper on each face, the machining operation is performed on both faces with two tapered base rings.

Tapered cast segments have also been produced by planing or milling the side flanged faces of individual segments mounted on correctly calculated base plates, all of which require special castings and machining.

In forming tapered tunnel segments of structural steel shapes or in one piece in a press by means of bending dies, the outer side faces of the side flanges of the rings will be 90° to the outer surface of the tunnel lining. This does not give true contact engaging surfaces when the rings are secured together, as the side flanges will engage or heel at the inside of the rings and have a gap at the outside surface. If this gap is not too great it can be closed by means of drawing up on the bolts which connect the side flanges together. If, however, the gap exceeds the tolerances allowed it would have to be closed by means of a seal weld, which might be a source of trouble for the contractor.

The importance of this problem has been considered and provided for in various ways in some of the important tunnels built and in some cases in constructing tunnels around curves iron packing has had to be placed between the rings to make the joints radiate properly from the center point of the curve. In other cases special castings have had to be used, and soft wood packing or the like has also been used to some extent.

One of the objects of our invention relates to producing a tunnel segment formed of structural material provided with side and end flanges which have true contact engaging side surfaces.

Another object of our invention relates to the apparatus for forming tunnel lining segments with side and end flanges having true contact engaging side surfaces.

Another object of our invention relates to the apparatus for forming a tapered tunnel lining segment having a skin plate with parallel side edges.

Another object of our invention relates to the apparatus for forming a tunnel lining segment having the side flanges extending parallel to each other with a skin plate of varying width.

Another object of our invention relates to the manner of assembling and clamping the parts of which the segment is formed in a jig having cheek plates with inclined faces adapted to produce the desired inclination of the side flanges of the segment.

Another object of our invention relates to the construction of the jig whereby the cradle with the structural parts of the segment mounted thereon may be rotated at different angles to facilitate the welding operation.

A further object of our invention relates to the manner of assembling and removing the segment from the jig.

With the foregoing and other objects in view, the invention will be more fully described hereinafter, and will be more particularly pointed out in the appended claims.

Referring now to the accompanying eleven sheets of drawings which form a part of this specification and on which like characters of reference indicate like parts.

Figure 2 is a vertical longitudinal section through the holding jig taken on the line 2—2 of Figure 3 with the outside frame in section to show more clearly the trunnion bearings for the same;

Figure 3 is a transverse section through the holding jig taken on the line 3—3 of Figure 2;

Figure 4 is a transverse section through one of the clamping jacks taken on the line 4—4 of Figure 5;

Figure 5 is a longitudinal section through one of the clamping jacks taken on the line 5—5 of Figure 4;

Figure 6 is a transverse section through the cradle taken on the line 3—3 of Figure 2, but drawn on an enlarged scale to show the construction more clearly;

Figure 7 is a top plan view of the cradle;

Figure 8 is a detail section view of the outside frame turning mechanism taken on the line 8—8 of Figure 9;

Figure 9 is a top plan view of the outside frame turning mechanism;

Figure 10 is a front elevation of the cradle turning mechanism;

Figure 11 is a horizontal section through the cradle turning mechanism taken on the line 11—11 of Figure 10;

Figure 12 is a side elevation of a portion of the cradle showing the movable side for the same drawn on an enlarged scale;

Figure 13 is a side elevation of a portion of the stationary side of the cradle;

Figure 14 is a front elevation of the movable end of the cradle;

Figure 15 is an end elevation of the movable end of the cradle;

Figure 16 is an end elevation of the fixed end of the cradle;

Figure 17 is a side elevation of one of the holding clamps;

Figure 18 is an end elevation of the said clamp;

Figure 19 is a detail showing the false key segment and the manner of holding the same in the cradle;

Figure 20 is a top plan view of one of the hold down beams;

Figure 21 is a side elevation of the hold down beam shown in Figure 20;

Figure 22 is a side elevation of one of the hold down pins;

Figure 23 is a side elevation of the outer side of the fixed side cheek plate;

Figure 24 is a transverse section of the same taken on the line 24—24 of Figure 23 showing a ribbed section;

Figure 25 is a section taken on the same line as Figure 24, but showing a solid section;

Figures 26, 27, 28 and 29 illustrate sections taken on the line 29—29 of Figure 23 showing the different angles of the sides of false cheek plates we may use;

Figure 30 is a side elevation of the inner side of the movable side false cheek plate;

Figure 31 is a transverse section of the same taken on the line 31—31 of Figure 30 showing a ribbed section;

Figure 32 is a section taken on the same line as Figure 31, but showing a solid section; and Figures 33, 34, 35 and 36 illustrate sections taken on the line 36—36 of Figure 30 showing the different angles of the sides of false cheek plates we may use.

Figure 1:
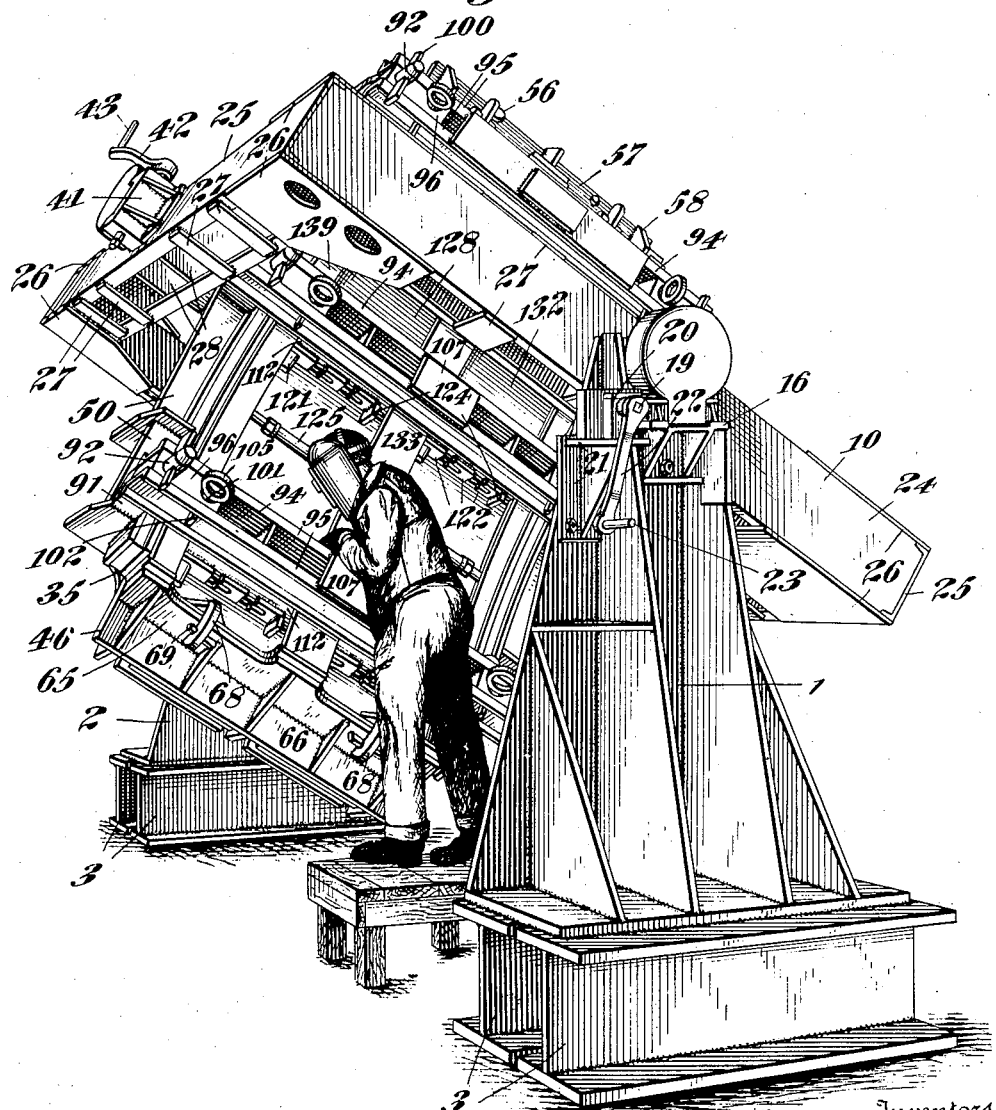
Figure 1 is a perspective view of the holding jig.

Referring now to the various characters of reference on the drawings:

The numerals 1 and 2 indicate the trunnion pedestals for supporting the jig which are formed of metal plates cut into the desired shape and welded together. These trunnion pedestals are each mounted on and welded to base members 3 formed of I-beams.

A bearing block 4 is welded to the upper end of each trunnion pedestal 1 and 2 which are provided with roller bearings 5 held in position by means of a cap washer 6. Trunnions 7 and 8 are journaled in roller bearings 5 each having an inwardly extending end portion inserted in a hole in the trunnion bearing blocks 9 of the outside frame 10 and welded thereto as at 11. The trunnion 8 extends outwardly from the bearing block 4 and has a worm wheel 12 keyed thereto meshing with a worm 13 which has its shaft 14 journaled in bearings 15 mounted on a bracket 16 secured to the upper portion of the trunnion pedestal 2. A beveled pinion 17 is mounted on one end of the shaft 14 of the worm 13 adapted to mesh with a beveled pinion 18 keyed to a shaft 19 journaled in bearings 20 which is mounted on a bracket 21 secured to the upper portion of the trunnion pedestal 2 adjacent to the bracket 16. The outer end of shaft 19 is provided with a crank arm 22 having a handle 23 by means of which the outside frame 10 may be rotated vertically.

This outside frame 10 comprises a rectangular frame formed of spaced channel shaped side and end members 24 and 25, respectively, disposed with their flanges extending inwardly toward each other and connected together at their ends by means of gusset plates 26 and at intermediate points by means of plates 27 and ribs 28.

As indicated more clearly in Figures 3 and 11 a journal bearing 29 is secured centrally to each of the inner channel shaped members of the end frame members 25 of the outside frame 10. These journal bearings 29 are each provided with a roller bearing 30 held in position by means of a cap washer 31. Trunnions 32 and 33 are journaled in the roller bearings 30 each having an inwardly extending end portion inserted in a hole in trunnion bearing blocks 34 of the cradle 35, and welded thereto as at 36, and a thrust bearing is inserted between each of the bearings 29 and the trunnion bearing blocks 34. The trunnion 33 extends outwardly from the journal bearing 29 beyond the side of the outside frame 10 and has a worm wheel 37 keyed thereto meshing with a worm 38 which has its shaft 39 journaled in bearings 40 mounted on a bracket 41 secured to one of the outer channel shaped end members 25 of the outside frame 10. The outer end of the shaft 39 is provided with a crank arm 42 having a handle 43 by means of which the cradle 35 can be rotated at right angles to the rotation of the outside frame 10.

The cradle 35 on which the structural parts of the tunnel segments are assembled and held during the welding operation is preferably built up of a plurality of parts welded together, and comprises arc shaped longitudinally extending spaced sills 44 connected together at their ends by means of flat plates 45 and 46. These longitudinal sills 44 are connected together at spaced intervals by means of transverse sills 47, each having upwardly extending end portions which are connected together at one side of the cradle by means of horizontally disposed plates 48 to which the movable side of the cradle is attached, while the opposite ends of the transverse sills 47 are connected together by means of a vertically extending side plate 49 forming the stationary side wall having horizontally extending reinforcing flanges welded thereto as at 50. The longitudinally and transversely extending sills 44 and 47 are further reinforced and connected at their central and intermediate portions by means of rectangular and gusset plates 51 and 52, respectively. The segment is assembled with the outer portion or skin plate 132 resting on the cradle and the flanges 136 and end plates 140 extending outwardly therefrom. This outer portion is of greater dimension than the outwardly extending ends of the flanges 136 so that to allow the parts of the segment to be assembled and the finished segment to be removed therefrom, one side and end of the cradle has to be movable, and for this purpose the end plate 45 is provided with holes 53 for receiving bolts 54 and tapered perforations 55 for receiving tapered pins 56. The movable end of the cradle 57 is reinforced by means of flanges 58 welded thereto and to a base plate 59 which is seated on the end plate 45 and has a notch at its inner end as at 60 for receiving the lower edge of the end plate 140 of the tunnel segment and said base plate is further provided with slots 61 and tapered perforations 62 which register with the holes 53 and the tapered perforations 55 in the end plate 45 adapted to receive the bolts 54 and the tapered pins 56. These bolts 54 and tapered pins 56 are slotted as at 63 to receive keys 64 for clamping the movable end of the cradle to the end plate 45. The stationary end wall 65 at the opposite end of the cradle is provided with reinforcing flanges 66 and has its lower end welded to the end plate 46 which is provided with a notch 67 at its inner end for receiving the lower edge of the other end plate 140 at the opposite end of the segment.

In order to hold the end plates of the segment securely in position in contact with the end walls of the cradle during the welding operation, clamps 68 are placed over the outer edges of the same and held in position by means of keys 69.

The movable side of the cradle 70 is attached to the horizontally disposed side plates 48 in a similar manner to that of the movable end of the cradle 57. The said side plates 48 have the holes 71 and tapered perforations 72 for receiving bolts 73 and tapered pins 74. This movable side 70 of the cradle is reinforced by means of flanges 75, welded thereto, and has a horizontally extending plate 76 which is seated on the base plate 48, having slots 77 and tapered perforations 78 therein which register with the holes 71 and tapered perforations 72 in the base plates 48 for receiving the bolts 73 and tapered pins 74. These bolts 73 and tapered pins 74 are also slotted as at 79 for receiving keys 80 for clamping the movable side 70 of the cradle to the side plate 48. In order to further reinforce and hold the movable side 70 of the cradle in position it is provided with brackets 81 which extend into notches 82 in the side plate 48.

The stationary and movable side walls 49 and 70 of the cradle are perforated to receive bolts 83 for attaching the cheek plates 84 and 85 thereto. These check plates which are more clearly illustrated in Figures 23 to 36, inclusive, are each preferably formed of a plate having one plain side surface 86 for engaging the side flanges 136 of the assembled segment while the other side is formed with ribs 87 and pads 88 having threaded holes formed therein as at 89 for receiving the threaded ends of the bolts 83. As these cheek plates look similar the two centrally disposed pads 88 on the stationary cheek plate 84 are placed in a different position than those on the movable cheek plate 85 in order to more quickly designate the cheek plates in assembling. The cheek plates are further provided with lifting lugs 90 to facilitate movement of the same. As stated above one side of each cheek plate is plain as at 86 with an angle substantially 90° to the edges and is adapted to engage the side flanges 136 of the tunnel segment while the other side of the cheek plates will have an inclination corresponding to the outer face of the side flanges of the segment which may be 90° or the angles indicated in full lines in Figures 24, 25, 27, 28, 29, 31, 32, 34, 35 and 36 to the angle indicated in dotted lines in these figures. The cheek plates may also be made of solid bars as shown in the sections in Figures 25 to 27 and 32 to 34, inclusive.

Threaded nuts 91 are welded to the central and end portions of the stationary and movable sides of the cradle on the center sides of the same at their upper edges. Each of these nuts 91 has a hold down post 92 with its lower end threaded therein which is further secured thereto by means of a pin 93. The nuts 91 attached to one side wall 49 at one side of the cradle are disposed in parallel alignment with the nuts on the opposite side wall 70 and are connected together by means of a hold down beam 94 comprising a pair of spaced channels 95 secured together at each end by means of blocks 96 each having holes 97 and 98 extending therethrough. The holes 98 are adapted to receive the projecting ends of the hold down posts 92 which are slotted as at 99 for receiving keys 100 adapted to clamp the hold down beams 94 in position. The holes 97 each have a hold down pin 101 mounted therein the lower end of which engages the side flange 136 of the segment. These hold down pins are each adjustably held in position by means of keys 102 which extend through slots 103 and 104 in the channels 95 and the hold down pins, respectively.

In order to facilitate the manipulation of the hold down beams 94 the hold down pins 101 are each formed with an eye 105 at the upper end and are further provided with a flange 106 near the lower end to prevent the pins from being detached from the hold down beam. At the central portion of each hold down beam the flanges of the spaced channels 95 at one side are secured together by means of a plate 107 and on the adjacent side the flanges are connected together by means of a clamping block 108 which extends therefrom and has a recess 109 formed therein for engaging the flanges of the central T-shaped reinforcing chord member 133 of the tunnel segment.

The longitudinally extending sills 44 at their upper edges have threaded nuts 110 welded thereto at spaced intervals, in each of which is threaded an adjustable set bolt 111 adapted to engage the outer face of the skin plate 132 of the segment and support the same in the cradle. These set bolts 111 are adjusted in the desired position by means of a template or the like (not shown) and then preferably welded permanently in the adjusted position.

The T-shaped chord member 133 is held centrally and the webs 138 of the special bulb angles forming the side flanges 136 of the segment are clamped securely against the inner plain surface 86 of the cheek plates 84 and 85 by means of a plurality of pairs of jacks 112, each comprising a plunger 113 for engaging the stem 134 of the T-shaped central chord member 133 and a sleeve 114 engaging the web 138 of the special shaped bulb angle. The sleeve 114 is keyed to the plunger 113 by means of a bolt 115 which is threaded as at 116 in a hole in the sleeve and has a reduced plain end 117 extending into a keyway 118 in the plunger. Said plunger and sleeve are slotted as at 119 and 120, respectively, for receiving adjustable wedges 121 for holding the jack 112 in the clamped position. The sleeve is further provided with reinforcing pads 122 welded thereto for backing up the slots and a U-shaped handle or lifting lug 123 and feet 124 adapted to rest on the inner surface of the skin plate 132 of the segment. We may also in some cases use clamping posts in addition to the jacks as indicated at 125 in Figure 1.

The segments are assembled from the inside in forming the tunnel lining rings, and as the outside of the tunnel is of greater diameter than the inside it is necessary to have a key segment which is placed in position after the other segments in the ring have been assembled. This requires that one of the segments engaging the key be made shorter than the other segments with one end plate 140 inclined at a greater angle than the other. As the cradle is adapted to hold assembled parts for segments of longer length it is sometimes necessary to fill in this space in the cradle by means of a false key member 126 as indicated in Figure 19. In this Figure 19 the inner end plate for the false key and the outer end plate for the short segment are seated in notched lugs 127 extending from the upper edge of the longitudinal sills 44 of the cradle.

We may, however, dispense with this false key member 126 and assemble the short segment and key segment directly together in the cradle in the manner indicated in dotted lines in Figures 12 and 13 of the drawings.

Having thus given a detailed description of our invention we will now describe the manner of assembling and holding the parts in forming the segment on the jig and the manipulation of the jig during the welding operation:—
Assuming that the cradle 35 of the jig is in the horizontal position indicated in Figures 2 and 3 and the hold down beams 94 and jacks 112 removed, and the parts of which the tunnel segment is constructed having been cut and formed in the desired shape. The skin plate 132 is first placed in the cradle 35 with the convex surface engaging the top ends of the set bolts 111. The bulb angles forming the side flanges 136 of the segment are then disposed with the bulbs 131 engaging the inner side edges of the skin plate, the webs 138 vertically adjacent to the plain surface 86 of the cheek plates 84 and 85 and the flanges 139 extending inwardly toward each other. The central T-shaped chord member 133 is then placed in position with the end of the stem 134 in contact with the inner surface of the skin plate 132. The jacks 112 are then inserted in position with their feet 124 resting on the inner surface of the skin plate. As illustrated in the drawings three pairs of jacks are used, but a greater or less number may be used if required; each pair is arranged in alignment with each other with the ends of their plungers 113 engaging opposite sides of the stem 134 of the T-shaped chord member 133 and the ends of the sleeves 114 engaging the webs 138 of the bulb angles. The wedges 121 are then driven in place through the slots 119 and 120 thereby clamping the webs 138 of the bulb angles firmly against the sides of the plain surfaces 86 of the cheek plates 84 and 85, and thereby holding the T-shaped chord member 133 in the desired spaced relation. The hold down beams 94 are then mounted in position on the hold down posts 92 and the keys 100 driven tightly into the slots 99 of said hold down posts. The lower ends of the hold down pins 101 will then engage the flanges 139 of the bulb angles and the clamping block 108 will engage the flanges of the T-shaped central chord thereby holding these members securely against the inner surface of the skin plate 132. The end plates 140 are then inserted in place and securely held by means of the clamps 68 and the keys 69. In this manner the assembled parts of the segment are securely held in the desired position and are now ready for the welding operation. In order to facilitate the welding operation the cradle 35 has to be tilted at different angles which is accomplished by the operator rotating the crank arm 22 by means of the handle 23, this will rotate the outside frame 10 and simultaneously the cradle 35 on a horizontal axis and tilt them vertically into any inclined position and by rotating the crank arm 42 by means of the handle 43 the operator can rotate the cradle 35 independently of the movement of the outside frame 10 and at right angles thereto.

After the welding operation the hold down beams 94 are removed by taking out the keys 100 in the hold down posts 92 which will allow them to be lifted off. The jacks 112 and clamps 68 are then removed by taking out the wedges 121 and keys 69. The tapered pins 56 and 74 for the movable end and side of the cradle are now removed and the keys 64 and 80 for securing the bolts 54 and 73 loosened to allow the movable end and side of the cradle to be slid outwardly until the inner ends of the slots 61 and 77 engage the bolts 54 and 73, respectively. The completed segment can then be lifted out of the cradle by means of a crane or the like. The movable side and end of the cradle are then slid back into the original position and again clamped in position by means of the bolts and tapered pins and keys and the assembling clamping and welding operation repeated as above described.

Although we have shown and described our invention in considerable detail, we do not wish it to be limited to the exact construction shown and described, but may use such substitutions, modifications or equivalents thereof, as are embraced within the scope of our invention, or as pointed out in the claims.

Having thus described our invention, what we claim as new and desire to secure by Letters Patent is:

1. A jig for receiving and supporting a plurality of structural shapes to be welded together in assembled relation to form a tunnel lining segment having a skin plate with longitudinally extending side bars and end plates secured thereto comprising a pair of fixed pedestal supports, a journal bearing mounted on each pedestal support, a rectangular outside frame, a trunnion extending from opposite sides of the rectangular outside frame journaled in the pair of fixed pedestal supports, a journal bearing mounted in each end of the rectangular outside frame, a cradle for supporting the plurality of assembled structural shapes, a trunnion extending from the opposite sides of the cradle journaled in the bearings mounted in the ends of the rectangular outside frame, means for clamping the plurality of assembled shapes in the cradle, and means for rotating the cradle and rectangular outside frame independently and at right angles to each other.

2. A jig for receiving and supporting a plurality of structural shapes to be welded together in assembled relation to form a tunnel lining segment having a skin plate with longitudinally extending side bars and end plates secured thereto comprising a pair of fixed pedestal supports, a journal bearing mounted on each pedestal support, a rectangular frame, a trunnion extending from the opposite sides of the rectangular frame journaled in the bearings on the fixed pedestal supports, gearing connected to one of the trunnions having means for rotating the rectangular frame and for holding said rectangular frame in an adjusted position, a journaled bearing mounted in each end of the rectangular frame, a cradle for supporting the plurality of assembled structural shapes, a trunnion extending from its opposite sides journaled in the bearings mounted in the ends of the rectangular frame, means for clamping the plurality of assembled structural shapes in the cradle, and gearing connected to one of the trunnions extending from the cradle having means for rotating said cradle and for holding said cradle in an adjusted position independently of the rectangular frame.

3. A jig for receiving and supporting a plurality of structural shapes to be welded together in assembled relation to form a tunnel lining segment having a skin plate with longitudinally extending side bars and end plates secured thereto comprising a pair of fixed pedestal supports, a rectangular frame, a trunnion extending horizontally from opposite sides of the rectangular frame journaled in bearings mounted on the pair of fixed pedestal supports, worm gearing connected to one of the trunnions, a crank arm for operating the worm gearing to rotate the rectangular frame in a vertical plane, a cradle for supporting the plurality of assembled structural shapes, means for clamping the plurality of assembled structural shapes in the cradle, a trunnion extending from the opposite sides of the cradle journaled in the ends of the rectangular frame, worm gearing connected to one of the trunnions of the cradle, and a crank arm for operating the worm gearing adopted to rotate the cradle a complete revolution at right angles to the rotation of the rectangular frame.

4. A jig for holding a set of structural elements to be welded together to form a tunnel lining segment having a skin plate with side and end members forming flanges for the segment secured thereto comprising a pair of fixed pedestal supports, a rectangular frame, trunnions extending from opposite sides of the rectangular frame journaled in bearings mounted on the fixed pedestal supports, a cradle for supporting the plurality of assembled structural elements pivotally mounted in the rectangular frame adapted to rotate at right angles thereto a complete revolution, side and end walls for the cradle, means for clamping the set of structural elements against the side and end walls of the cradle, means for integrally securing one of the side and end walls to the cradle, and means for securing the opposite side and end walls to the cradle to allow for lateral movement.

5. A jig for holding a set of structural elements to be welded together to form a tunnel lining segment having a skin plate with side and end members forming flanges for the segment secured thereto, comprising a pair of fixed pedestal supports, a rectangular frame, a trunnion extending from the opposite sides of the rectangular frame journaled in bearings mounted on the fixed pedestal supports, means for rotating the rectangular frame a complete revolution, a cradle for supporting the assembled structural elements pivotally mounted in the rectangular frame adapted to rotate at right angles thereto, side and end walls for the cradle, means for reinforcing the side and end walls of the cradle, cheek plates attached to the inner surfaces of the side walls of the cradle, means for clamping the set of structural elements against the cheek plates and the end walls of the cradle, means for integrally securing one of the side and end walls to the cradle, and means for securing the opposite side and end walls to the cradle to allow for lateral movement.

6. A jig for holding a set of structural elements to be welded together to form a tunnel lining segment having a skin plate with side and end members forming flanges for the segment secured thereto, comprising a frame, means for pivotally supporting the frame at opposite sides, means for rotating the frame, a cradle journaled in the opposite ends of the frame for holding the assembled set of structural elements, means for clamping the structural elements in assembled relation in the cradle, longitudinal and transverse sills for the cradle, a flat plate integrally connecting each end of the longitudinal and transverse sills of the cradle together, a side and end wall for the cradle formed integral therewith, and means for securing the opposite side and end walls to the flat plates connecting the ends of the longitudinal and transverse sills to allow for lateral movement.

7. A jig for holding a set of assembled structural elements to be welded together to form a tunnel lining segment having a skin plate with side and end members forming flanges for the segment secured thereto, comprising a rectangular outside frame adapted to rotate in a vertical plane, a pivotal support for the rectangular outside frame at opposite sides, a cradle journaled in the opposite ends of the rectangular outside frame adapted to rotate with the rectangular outside frame or independently thereof at right angles thereto a complete revolution, and vertically and transversely applied clamping means for holding the assembled structural elements in the cradle.

8. A jig for holding a set of assembled structural elements to be welded together to form a tunnel lining segment having a skin plate with side and end elements forming the flanges of the segment secured thereto, comprising a rectangular outside frame adapted to rotate in a vertical plane, a pivotal support for the rectangular outside frame at opposite sides, a cradle for supporting the assembled elements journaled in the opposite ends of the rectangular outside frame adapted to be rotated simultaneously with the rectangular outside frame a complete revolution, means for rotating the cradle a complete revolution independently of the outside frame and at right angles thereto, and means for clamping the set of assembled structural elements in the cradle.

9. A jig for holding a set of structural elements to be welded together to form a tunnel lining segment having a skin plate with side and end members forming flanges for the segment secured thereto, comprising a pair of fixed pedestal supports, a rectangular frame, trunnions extending from opposite sides of the rectangular frame journaled in bearings mounted on the fixed pedestal supports, means for rotating the rectangular frame, a cradle for supporting the assembled structural elements pivotally mounted in the rectangular frame, side and end walls for the cradle, cheek plates attached to the inner faces of the side walls of the cradle, jacks for clamping the structural elements forming the side flanges of the segment against the cheek plates, and hold down beams and clamps for holding the structural elements in the cradle.

10. A jig for holding a set of assembled structural elements to be welded together to form a tunnel lining segment having a skin plate with side and end structural elements forming the side and end flanges of the segment secured thereto, comprising a pair of fixed pedestal supports, a rectangular frame, trunnions extending from opposite sides of the rectangular frame journaled in bearings mounted on the fixed pedestal supports, means for rotating the rectangular frame, a cradle for supporting the assembled structural elements pivotally mounted in the rectangular frame, side and end walls for the cradle, and clamping devices attached to the side and end walls of the cradle adapted to engage and retain longitudinally and transversely extending structural elements forming the side and end flanges of the segment in assembled relation in contact with the skin plate.

11. A jig for holding a plurality of assembled structural shapes to be welded together to produce a tunnel lining segment having a skin plate with side flanged shapes and end plates, comprising a rotatably mounted frame, a pivotal support for the frame at opposite sides, a cradle rotatably supported in journal bearings in the opposite ends of the frame, side and end walls for the cradle, jacks extending transversely of the cradle for holding the side flanges of the segment in clamped relation with the side walls of the cradle, and clamping devices attached to the side and end walls of the cradle adapted to engage and retain the side flanged shapes and end plates in assembled relation in contact with the skin plate.

12. A jig for holding a plurality of assembled structural shapes to be welded together to produce a tunnel lining segment having a skin plate with longitudinal bars and end plates attached thereto, comprising a pair of fixed pedestal supports each having a journal bearing mounted thereon, a rectangular frame, trunnions extending from opposite sides of the rectangular frame journaled in the bearings mounted on the fixed pedestal supports, means for rotating the rectangular frame a complete revolution, a cradle for supporting the assembled structural shapes having trunnions extending from opposite sides of the cradle journaled in the ends of the rectangular frame, means for rotating the cradle a complete revolution at right angles to the rotation of the rectangular frame, said cradle having side and end walls with clamping means mounted thereon for holding the assembled longitudinally extending bars and end plates forming the side and end flanges of the segment in assembled relation in contact with the skin plate, and jacks for holding the longitudinal bars in fixed spaced relation to each other.

13. A jig for holding a plurality of assembled structural shapes to be welded together to produce a tunnel lining segment having a skin plate with side and end structural shapes forming the flanges of the segment secured thereto, comprising a rectangular frame, pivotal supports for the opposite sides of the rectangular frame, means for rotating the rectangular frame, a cradle for supporting the assembled structural shapes, having trunnions journaled in the opposite ends of the rectangular frame, means for rotating the cradle independently of the rectangular frame a complete revolution, and adjustable clamping devices mounted on the cradle adapted to hold the structural shapes in assembled relation in the cradle.

14. A jig for holding a plurality of assembled structural shapes to be welded together to produce a tunnel lining segment having a skin plate with side and end structural shapes forming the flanges of the segment secured thereto, comprising a pair of fixed pedestal supports, a rectangular frame having a trunnion extending from opposite sides of the rectangular frame journaled in bearings mounted on the pedestal supports, means for rotating the rectangular frame a complete revolution, a cradle having longitudinally and transversely extending sills, a plate connecting each end of the longitudinally and transversely extending sills together, a fixed and a movable wall at the opposite ends and sides of the cradle, trunnions extending from the opposite ends of the cradle journaled in the ends of the rectangular frame, and adjustable clamping devices mounted on the cradle adapted to hold the structural shapes in assembled relation in the cradle.

15. A jig for holding a plurality of assembled structural shapes to be welded together to produce a tunnel lining segment having a skin plate with longitudinal extending bars and end plates welded thereto, comprising a frame, pivotal supports for the frame, means for rotating the frame, a cradle journaled in bearings in the ends of the frame adapted to rotate independently of the frame a complete revolution, said cradle having longitudinally extending sills with arc shaped edges, transverse sills connecting the longitudinal sills, nuts secured at spaced intervals to the sides of the longitudinal sills, a set bolt in each nut having one end extending beyond the arc shaped edge of the longitudinal sills for supporting the skin plate, side walls extending from the end of the transverse sills, end walls extending from the ends of the longitudinally extending sills, and clamping devices secured to the side and end walls of the cradle adapted to hold the structural shapes in assembled relation in the cradle.

16. A jig for holding a plurality of assembled structural shapes to be welded together to produce a tunnel lining segment having a skin plate with longitudinally extending bars and end plates, comprising a rectangular frame, pivotal supports for opposite sides of the rectangular frame, means for rotating the rectangular frame, a cradle for supporting the assembled shapes mounted in the rectangular frame, a journal bearing in the opposite ends of the rectangular frame for supporting the cradle, means for rotating the cradle in the rectangular frame a complete revolution, side and end walls for the cradle, a cheek plate attached to each side wall, means for supporting the skin plate in the cradle, jacks transversely disposed for clamping a longitudinally extending bar against each cheek plate, and clamping devices attached to the side and ends of the cradle adapted to hold the longitudinally extending bars and end plates in assembled relation in contact with the edges of the skin plate.

17. A jig for holding a plurality of assembled structural shapes to be welded together to produce a tunnel segment having a skin plate with longitudinally extending bars and end plates adapted to form the flanges of the segment secured thereto, comprising a pair of fixed pedestal supports, a rectangular frame having a trunnion extending from its opposite sides and journaled in the pair of fixed pedestal supports, worm gearing connected to one of the trunnions operated by means of a crank arm for rotating the rectangular frame a complete revolution, a cradle for supporting the assembled structural shapes having a trunnion extending from its opposite ends journaled in the ends of the rectangular frame, worm gearing connected to one of the trunnions of the cradle operated by means of a crank arm for rotating the said cradle a complete revolution independently of the rectangular frame, and adjustable clamping devices mounted on the cradle adapted to hold the plurality of structural shapes in assembled relation in the cradle.

18. A jig for holding a plurality of assembled structural shapes to be welded together to form a tunnel lining segment having a skin plate with longitudinally extending bars and end plates secured thereto, comprising a frame, pivotal supports for the frame, means for rotating the frame and holding it in a set position, a cradle rotatably mounted for complete rotation in the frame, a journal bearing in the opposite ends of the frame for supporting the cradle, a fixed and movable side for the cradle, a cheek plate attached to the inner face of the fixed and movable sides of the cradle, a fixed and a movable end for the cradle, jacks for clamping an assembled shape against the inner side of each cheek plate, and clamping devices secured to the sides and ends of the cradle adapted to hold the plurality of structural shapes in assembled relation in the cradle and in contact with the skin plate.

19. A jig for holding a plurality of assembled structural shapes to be welded together to produce a tunnel lining segment having a skin plate with longitudinally extending bars and end plates attached thereto, comprising a frame, a pivotal support for the opposite sides of the frame, means for rotating the frame, a cradle for supporting the structural shapes in assembled relation having longitudinal and transverse sills mounted in the frame, a journal bearing in the opposite ends of the frame for supporting the cradle, means for rotating the cradle a complete revolution independently of the frame, means mounted on the longitudinal sills of the cradle for supporting the skin plate, sides and end walls for the cradle for aligning the longitudinally extending bars and end plates, and a plurality of hold-down beams having their ends secured to the sides of the cradle for clamping the longitudinally extending bars for the segment against the inner surface of the skin plate.

20. A jig for holding a plurality of assembled structural shapes to be welded together to produce a tunnel lining segment having a skin plate with longitudinally extending bars and end plates forming the side and end flanges of the segment attached thereto, comprising a frame, a pivotal support for the opposite sides of the frame, means for rotating the frame, a cradle for supporting the structural shapes having longitudinal and transverse sills mounted in the frame, a journal bearing in the opposite ends of the frame for supporting the cradle, means for rotating the cradle a complete revolution independently of the frame, means mounted on the longitudinal sills of the cradle for supporting the skin plate, sides and end walls for the cradle, means for clamping the longitudinally extending bars and end plates against the side and end walls of the cradle, a plurality of nuts secured to each side of the cradle, each of said nuts on one side of the cradle being disposed in alignment with the nuts on the opposite side of the cradle, a hold down post secured to each nut, and a transversely extending hold down beam connecting the hold down posts and clamped thereto on opposite sides of the cradle having means mounted thereon for engaging and holding the longitudinally extending bars for the segment against the inner surface of the skin plate.

21. A jig for holding a plurality of assembled structural shapes to be welded together to produce a tunnel lining segment having a skin plate with longitudinally extending bars and end plates forming the side and end flanges of the segment attached thereto, comprising a frame, a pivotal support for the opposite sides of the frame, means for rotating the frame, a cradle for supporting the structural shapes in assembled relation having longitudinal and transverse sills mounted in the frame, a journal bearing in the opposite ends of the frame for supporting the cradle, means for rotating the cradle a complete revolution independently of the frame, adjustable means mounted on the longitudinal sills of the cradle for supporting the skin plate, side and end walls for the cradle for aligning the longitudinally extending bars and end plates, hold down posts secured to each side wall of the cradle, transversely extending hold down beams connecting the hold down posts, a slot in each hold down post, a tapered key extending through each slot for engaging and clamping the ends of the hold down beam, means mounted on the hold down beams for engaging and holding the longitudinally extending bars for the segment against the inner surface of the skin plate, and means for clamping the end plates for the segment against the end wall of the cradle.

22. A jig for holding a plurality of assembled structural shapes to be welded together to produce a tunnel lining segment having a skin plate with longitudinally extending bars and end plates forming the side and end flanges of the segment attached thereto, comprising a frame, a pivotal support for the opposite sides of the frame, means for rotating the frame, a cradle for supporting the structural shapes in assembled relation having longitudinal and transverse sills mounted to rotate in the frame, a journal bearing in the opposite ends of the frame for supporting the cradle, means for rotating the cradle a complete revolution independently of the frame, means mounted on the longitudinal sills of the cradle for supporting the skin plate, a movable and fixed side and end walls for the cradle, means for clamping a longitudinally extending bar of the segment in clamped relation against each side wall of the cradle, means for clamping the end plates for the segment against the end walls of the cradle, and adjustable clamping means for the movable side and end walls of the cradle.

23. A jig for holding a plurality of assembled structural shapes to be welded together to produce a tunnel lining segment and a key each having a skin plate with longitudinally extending bars and end plates forming the side and end flanges of the segments attached thereto, comprising a frame, a pivotal support for the opposite sides of the frame, means for rotating the frame, a cradle having side and end walls for supporting the structural shapes in assembled relation having longitudinal and transverse sills mounted to rotate in the frame, a journal bearing in the opposite ends of the frame for supporting the cradle, means for rotating the cradle a complete revolution independently of the frame, means mounted on the longitudinal sills for supporting the skin plates, means for holding the longitudinally extending bars for the segment and key in clamped relation against the side walls of the cradle, and means for clamping the end plates of the segment and key in clamped relation with the end walls of the cradle.

24. A jig for holding a plurality of assembled structural shapes to produce a relatively short tunnel lining segment having a skin plate with longitudinally extending bars and end plates forming the side and end flanges of the segment welded together, comprising a frame, a pivotal support for the opposite sides of the frame, means for rotating the frame, a cradle having side and end walls for supporting the structural shapes in assembled relation and having longitudinal and transverse sills mounted to rotate in the frame, a journal bearing in the opposite ends of the frame for supporting the cradle, means for rotating the cradle independently of the frame, means mounted on the longitudinal sills of the cradle for supporting the skin plate, means for holding the longitudinally extending bars for the segment in clamped relation against each side wall of the cradle, a false key adapted to be removably attached to one end of the relatively short segment, means at the opposite end of the false key and short segment for clamping them to the end walls of the cradle, and transversely extending hold down beams having their ends secured to the sides of the cradle for holding the longitudinally extending bars for the segment against the inner surface of the skin plate.

25. A jig for holding a plurality of assembled structural shapes to produce a tunnel lining segment having a skin plate with longitudinally extending bars and end plates forming the side and end flanges of the segment welded thereto, comprising a frame, a pivotal support for the opposite sides of the frame, means for rotating the frame, a cradle for supporting the structural shapes in assembled relation having longitudinal and transverse sills mounted to rotate in the frame, a journal bearing in opposite ends of the frame for supporting the cradle, means for rotating the cradle a complete revolution independently of the frame, side and end walls secured to the ends of the longitudinal and transverse sills of the cradle, means mounted on the longitudinal sills of the cradle for supporting the skin plate, a plurality of pairs of jacks arranged in alignment transversely of the cradle, said jacks each having a sleeve and a plunger mounted therein with transversely aligned slots, and tapered keys extending through the slots for holding the ends of the jacks in clamped relation with the longitudinally extending bars of the segment and side walls of the cradle.

26. A jig for holding a plurality of assembled structural shapes to produce a tunnel lining segment having a skin plate with longitudinally extending side bars and end plates forming the side and end flanges of the segment welded thereto, comprising a frame, a pivotal support for the opposite sides of the frame, means for rotating the frame, a cradle for supporting the structural shapes in assembled relation adapted to rotate with the frame having longitudinal and transverse sills, a journal bearing in opposite ends of the frame for supporting the cradle, means for rotating the cradle a complete revolution independently of the frame, side and end walls secured to the ends of the longitudinal and transverse sills of the cradle, means mounted on the longitudinal sills for supporting the skin plate, means for holding the longitudinally extending side bars and end plates in contact with the side and end edges of the skin plate, cheek plates secured to the inner surface of the side walls of the cradle each having a side surface of varying inclination and converging longitudinally toward each other at one end of the cradle, jacks for holding the longitudinally extending side bars of the segment against the side surfaces of the cheek plates, and clamping means secured to the side and end walls of the cradle for holding the longitudinally extending side bars and end plates of the segment in contact therewith.

27. A jig for holding a plurality of assembled structural shapes to produce a tunnel lining segment having a skin plate with longitudinally extending bars and end plates welded thereto, comprising a frame, a pivotal support for the opposite sides of the frame, means for rotating the frame, a cradle journaled in the frame and adapted to rotate therewith having longitudinal and transverse sills, a journal bearing in opposite ends of the frame for supporting the cradle, means for rotating the cradle independently of the frame, side and end plates connecting the ends of the longitudinal and transverse sills of the cradle, side and end walls for the cradle secured to the said side and end plates, set bolts mounted on and extending above the longitudinal sills of the cradle for supporting the skin plate, cheek plates secured to the inner surfaces of the side walls of the cradle, each of said cheek plates having a vertically inclined side surface of varying inclination and converging longitudinally toward each other at one end of the cradle, a plurality of pairs of transversely disposed jacks for holding the longitudinally extending side bars of the segment against the side surfaces of the cheek plates, and independently mounted clamping means secured to the sides and end walls of the cradle for holding the longitudinally extending side bars and end plates of the segment.

LEWIS FINE.
HARLEY B. KELCHNER.